United States Patent
Jeong et al.

[11] Patent Number: 5,937,129
[45] Date of Patent: Aug. 10, 1999

[54] WAVEGUIDE GRATING STRUCTURE HAVING LINEAR AND NONLINEAR WAVEGUIDING FILM

[75] Inventors: Jong-Sool Jeong; Seok-Ho Song, both of Daejeon, Rep. of Korea

[73] Assignee: Electronics and Telecommunications Research Institute, Yusong-Ku, Rep. of Korea

[21] Appl. No.: 08/932,083

[22] Filed: Sep. 17, 1997

[30] Foreign Application Priority Data

Dec. 4, 1996 [KR] Rep. of Korea ............... 96-61699

[51] Int. Cl.$^6$ .............. G02B 6/10; H04J 14/02
[52] U.S. Cl. .............. 385/129; 385/14; 385/37; 385/130; 385/131; 385/122; 359/124; 359/127; 359/130
[58] Field of Search ............... 385/1, 2, 3, 10, 385/14, 37, 122, 129, 130, 131, 132, 141, 41, 42; 359/124, 127, 130, 115

[56] References Cited

U.S. PATENT DOCUMENTS

| | | | |
|---|---|---|---|
| 3,822,927 | 7/1974 | Zernike | 385/122 X |
| 4,431,263 | 2/1984 | Garito | 385/122 X |
| 4,946,235 | 8/1990 | Scozzafava et al. | 385/122 X |
| 4,955,977 | 9/1990 | Dao et al. | 385/122 X |
| 5,006,729 | 4/1991 | Meijer et al. | 385/122 X |
| 5,028,109 | 7/1991 | Lawandy | 385/122 X |
| 5,113,473 | 5/1992 | Yoshida et al. | 385/131 |
| 5,155,791 | 10/1992 | Hsiung | 385/122 |
| 5,170,461 | 12/1992 | Yoon et al. | 385/130 |
| 5,317,666 | 5/1994 | Agostinelli et al. | 385/122 |
| 5,333,216 | 7/1994 | Sakata et al. | 385/28 |
| 5,335,303 | 8/1994 | Buchecker et al. | 385/122 |
| 5,699,378 | 12/1997 | Lealman et al. | 385/131 X |
| 5,852,702 | 12/1998 | Nishida et al. | 385/130 |

OTHER PUBLICATIONS

*Nonlinear Grating Couplers In Integrated Optics*, Robert S. Moshrefzadeh and Science Research Laboratory, 3M, St. Paul, Minnesota and George I. Stegeman, Optical Sciences Center, University of Arizona, Tucson, Arizona, pp. THB6–1 —THB6–4 (no date of publication).

Power–dependent output properties of a nonlinear grating coupler, Masayuki Matsumoto and Manabu Ohtsuka, Department of Communication Engineering, Osaka University, Osaka, Japan. J. Appl. Phys. 71 (4), 15 Feb. 1992, pp. 2051–2053.

Nonlinear all–opotical beam scanner, Gaetano Assanto and George I. Stegeman, Optical Sciences Center, University of Arizona, Tucson, Arizona, J. Appl. Phys. 67 (3), Feb. 1, 1990, pp. 1188–1193.

Focusing–grating–coupler arrays for uniform and efficient signal distribution in a backboard optical interconnect, Seok Ho Song and El Hang Lee, Applied Opt ics, Sep 10, 1995, vol. 34, No. 26.

*Primary Examiner*—Brian Healy
*Attorney, Agent, or Firm*—Cohen, Pontani, Lieberman & Pavane

[57] ABSTRACT

A structure of optical grating slab waveguide including a light waveguiding layer with linear refractive index disposed on another waveguiding layer having a nonlinear refractive index. The refractive index of nonlinear waveguiding material is a function of intensity of optical power incident therein. The structure of this invention provides an optical waveguide having improved optically coupling coefficient. A optical grating structures formed with a slab waveguide of this invention may be used as a wavelength selective coupling device of bidirectional optical coupler that is particularly useful as demultiplexer or multiplexer.

5 Claims, 2 Drawing Sheets

WHERE, $n_2 > n_0$ $P_{INPUT} < P_{CRITICAL}$ $P_{COUP}$ $P_{INPUT} > P_{CRITICAL}$ $P_{nl}$

WAVEGUIDE GRATING STRUCTURE HAVING LINEAR AND NONLINEAR WAVEGUIDING FILM

BACKGROUND OF THE INVENTION

1. Field of the Invention

The present invention relates to optical waveguide, and more particularly to, a structure of optical grating slab waveguide having a light waveguiding layer with linear refractive index disposed on another waveguiding layer having nonlinear refractive index that may be used as active optical interconnection, optical switching devices, and wavelength selective coupling devices of bidirectional optical coupler.

2. Description of the Related Art

Over the past decades there has been considerable interest in optical grating arrays disposed on a slab waveguide. A conventional structure of grating slab waveguide is consisted of the grating structures and single-layer-waveguiding film stacked on substrate. The waveguide film has either linear or nonlinear coefficient of refractive index. The optical grating structures disposed on the waveguide film have been widely used to optical grating coupler, and optical interconnection. In particular, the nonlinear slab waveguide operates as a power dependent grating coupler or all optical beam scanner. Also, grating assisted directional coupler (GADC) with linear or nonlinear slab waveguide has been greatly investigated because this structure can be applied to wavelength selective coupler of wavelength division multiplexing (WDM).

Focusing grating coupler array based on slab waveguide with waveguiding layer having a linear refractive index is disclosed in Applied optics, Vol. 34, NO. 26, page 5913–5919, September 1995, by Song and Lee. In the operation of the focusing grating coupler array, the input signal beams guided into the slab waveguide are collimated by the guide-lenses and they propagate in the waveguiding film. The propagating light is diffracted at each point of the chirped grating toward the focal point with the diffraction angle q. The wavelength of diffracted light is a function of a diffraction angle q. The guided wave decays exponentially with the propagation in the waveguiding film due to the power leakage resulting from the out coupling to the radiation modes. After the guided wave passes through a focusing grating coupler array with length of L, the amplitude is decayed by the factor of $$A(L)=e^{-\alpha L} \quad (1)$$

Where a is radiation decay coefficient, obtained by $$\alpha=(1-t)/(4T \tan \theta_0) \quad (2)$$

Where $\theta_0$ is propagation angle of the light, T is effective thickness of the waveguiding film, and t is an efficiency of zeroth order diffraction.

A multiplexer or demultiplexer with wavelength selective coupling devices consisted of conventional slab waveguide structure suffer from the drawbacks of optical power loss due to out coupling to the radiation mode.

SUMMARY OF THE INVENTION

It is therefore an object of the invention to provide a slab waveguide having improved coupling efficiency of focusing grating coupler array.

One object of this invention is to provide a slab waveguide having improved coupling efficiency which can be controlled by changing the incident optical power.

Another object of this invention is to provide a grating array disposed on slab waveguide having characteristics of the optical bistability.

These and other objects of this invention are achieved by providing a grating slab waveguide comprising: a substrate; a first waveguiding film having a nonlinear coefficient of refractive index which is dependent on power intensity of propagating wave; a second waveguiding film layered on said first waveguiding film having linear refractive index; wherein the refractive index of said second waveguiding film is higher than linear refractive index of said first waveguiding film; an optical grating-structure disposed on said second waveguide film.

BRIEF DESCRIPTION OF THE DRAWINGS

These and other objects, and features and advantages of the invention, and the invention itself, will become better understood by reference to the following detailed description of the presently preferred embodiments when considered with the accompanying drawings, wherein.

DETAILED DESCRIPTION OF THE PREFERRED EMBODIMENT

Figure 1:
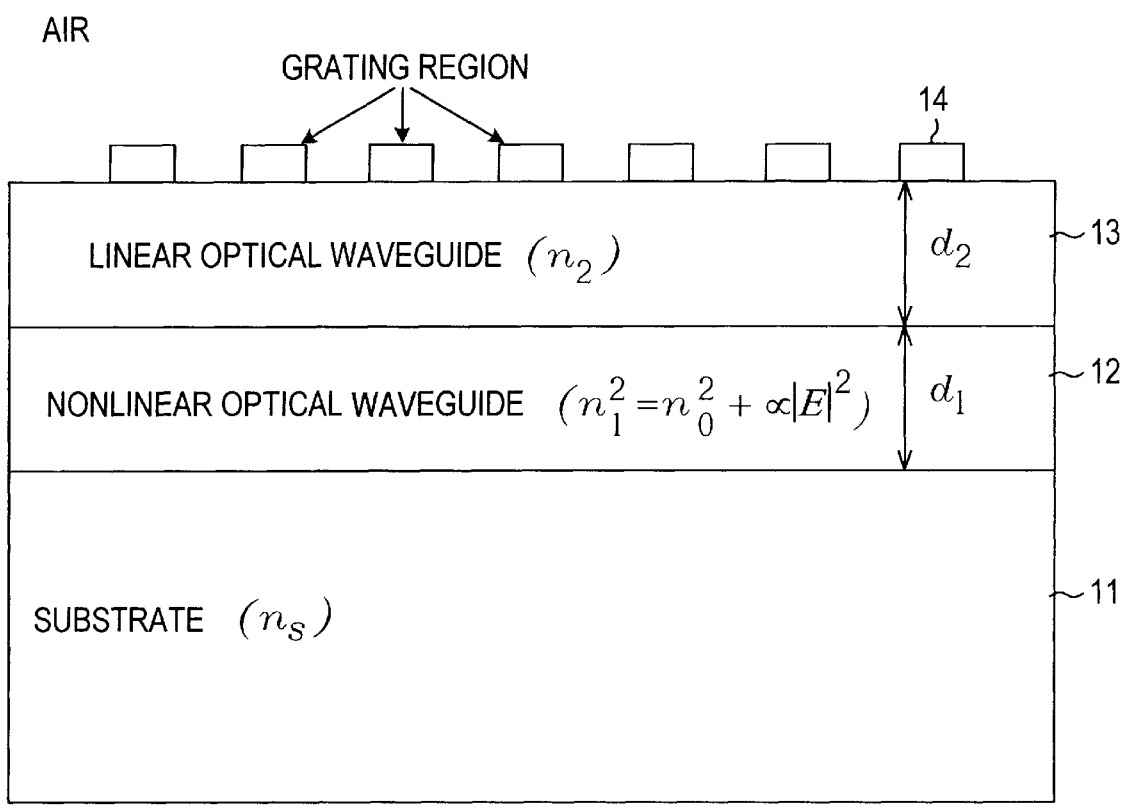
FIG. 1 is a schematic perspective view showing preferred embodiment of the invention.

Referring now to FIG. 1, preferred embodiment of this invention is shown. A waveguiding film 12 with nonlinear refractive index is layered on the main surface of a substrate 11. The refractive index of said nonlinear film 12, $n_1$, is dependent on power intensity of propagating light, which is represented by the following equation (3)

$$n_1^2 = n_0^2 + \alpha_n |E|^2 \quad (3)$$

Where $n_0$ is linear refractive index of the nonlinear film 12, $\alpha_n$ is a coefficient for dependence of nonlinear refractive index on power intensity of propagating wave of nonlinear film 12, and E is the electric field intensity of propagating light. Another waveguiding film 13 having linear refractive index $n_2$ which is larger than $n_0$, is layered on the said nonlinear film 12. A structure of optical gratings 14 are formed on the said waveguiding film 13.

Figure 2A:
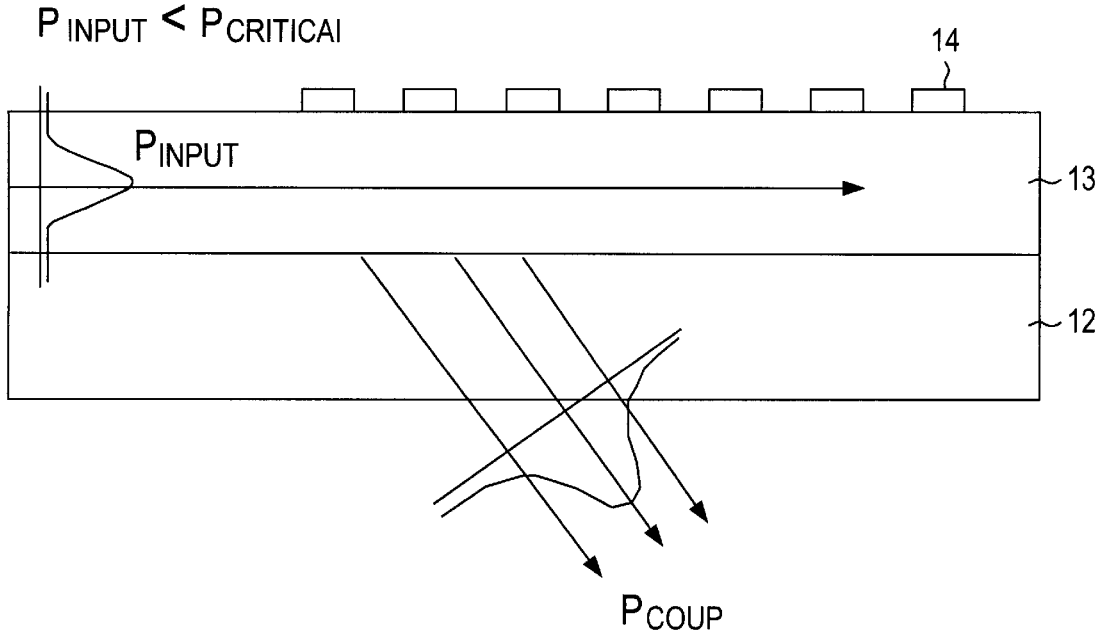
FIGS. 2A and 2B illustrate that propagating path in the waveguide is adjusted by wave power of propagating light.
Figure 2B:
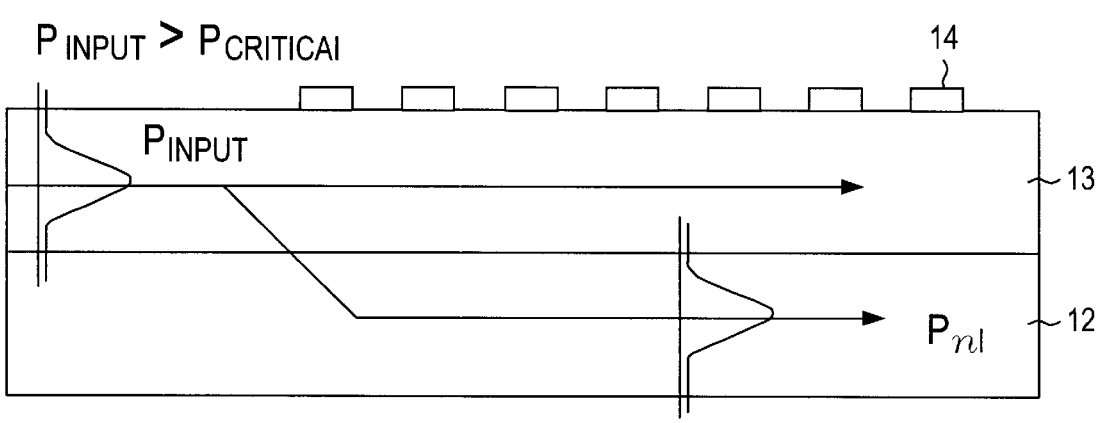

FIG. 2 shows a conceptual diagram which represent that the propagating path is determined by the incident power. In FIG. 2, $P_{input}$ is optical power incident into linear wavguiding film 13, $P_{coup}$ is power of refracted light toward substrate, $P_{n1}$ is output power of propagating light at the end of said nonlinear film 12.

The coupling efficiency of slab waveguide, η, is defined by the ratio between incident power and power of refracted light toward substrate, which is represented by:

$$\eta = P_{coup}/P_{input} \quad (4)$$

Since the refractive index of nonlinear guiding film is function of optical power, the coupling efficiency of waveguide according to this invention can be controlled by changing the incident power therein.

When the power of incident light, $P_{input}$, is smaller than critical intensity of power, $P_{critical}$, the incident light is traveling through linear waveguiding film 13, because the refractive index of nonlinear film 12, $n_0$, is smaller than that of linear film 13 (i.e., $n_2 > n_0$). The traveling light in linear waveguiding film 13 is diffracted at each point of the optical grating structure 14, toward the substrate with the diffraction angle θ. The wavelength of diffracted light is a function of a diffraction angle θ. The guided wave decays exponentially with the propagation in the waveguiding film due to the power leakage as expressed by equation (1) and (2).

In other case, when incident power of input light, $P_{input}$, is larger than critical intensity of power, $P_{critical}$, the total value of refractive index of nonlinear film 12 represented by Eq.(3), becomes larger than that of linear film 13, thereby, incident light to linear film is diffracted toward nonlinear film 12, then the diffracted light propagates therein. The coupling efficiency of slab waveguide is the ratio between incident power and power of diffracted light toward substrate. Thereby, the coupling efficiency of waveguide in preferred embodiment can be controlled by changing the input power of incident light.

The guided optical wave in the nonlinear waveguiding film can propagate in the layer 12 without the exponential decay factor because the optical wave in the nonlinear film is not diffracted by the grating arrays. Therefore, this structure provides a slab waveguide structure having characteristics of the optical stability by properly designing the thickness of nonlinear film 12 and linear film 13. This feature of preferred structure means that this invention provides devices for optical switching from 2 dimensional space to 3 dimensional space.

Since the wavelength of diffracted light is a function of a diffraction angle θ, this structure provides devices for optical directional coupler of wavelength selective coupling devices. A optical grating arrays formed with a slab waveguide of this invention may be used as a wavelength selective coupling device of bidirectional optical coupler that is particularly useful as demultiplexer or multiplexer.

It will be apparent that different working embodiment in a wide range can be formed without deviation from the sprit and the scope of the present invention. Therefore, the present invention is not restricted by the specific embodiment described and illustrated herein except as being limited in the appended claims.

What is claimed is:

1. A grating slab waveguide comprising:
   a substrate having a main surface;
   a first waveguiding film formed on said main surface of said substrate and having a first refractive index dependent on a nonlinear coefficient of refractive index;
   a second waveguiding film formed on said first waveguiding film and having a second linear refractive index; wherein said second linear refractive index of said second waveguiding film is larger than said first refractive index of said first waveguiding film when an incident optical power into said second waveguiding film is smaller than a critical value;
   a structure of optical gratings disposed on said second waveguiding film.

2. The slab waveguide according to claim 1, wherein: said first refractive index of said first waveguiding film is dependent on a power intensity of incident light therein.

3. The slab waveguide according to claim 1, wherein: said first refractive index of said first waveguiding film, $n_1$, is represented by the following equation, $$n_1^2 = n_0^2 + \alpha_n |E|^2$$

Where $n_0$ is a third linear refractive index of said first waveguiding film, $\alpha_n$ is a coefficient representing the dependence of said first refractive index on a power intensity of propagating light in said first waveguiding film, and E is said power intensity of propagating light in said first waveguiding film.

4. The slab waveguide according to claim 1, wherein: said structure of optical gratings on said slab waveguide shows characteristics of optical bistability when the thickness of said first waveguiding film and said second waveguiding film is adjusted.

5. A slab waveguide comprising:
   a substrate having a main surface;
   a first waveguiding film layered on the main surface of said substrate having a nonlinear refractive index, wherein:
   said nonlinear refractive index of said first waveguiding film, $n_1$, is represented by the following equation, $$n_1^2 = n_0^2 + \alpha_n |E|^2$$

Where $n_0$ is a first linear refractive index of said first waveguiding nonlinear film, $\alpha_n$ is a coefficient representing the dependence of said nonlinear refractive index on a power intensity of propagating light in said first waveguiding film, and E is said power intensity of propagating light in said first waveguiding film;
   a second waveguiding film layered on said first waveguiding film having a second linear refractive index; wherein the second linear refractive index of said second waveguiding film is larger than a value of said $n_0$; and
   a plurality of optical gratings disposed on said second waveguiding film.

* * * * *